United States Patent [19]

Black

[11] Patent Number: 4,627,049
[45] Date of Patent: Dec. 2, 1986

[54] TASI SYSTEM INCLUDING AN ORDER WIRE

[75] Inventor: David H. A. Black, Chelsea, Canada

[73] Assignee: Northern Telecom, Ltd., Ottawa, Canada

[21] Appl. No.: 218,683

[22] Filed: Dec. 22, 1980

[30] Foreign Application Priority Data

Oct. 3, 1980 [CA] Canada .................................. 361499

[51] Int. Cl.⁴ .............................................. H04J 3/00
[52] U.S. Cl. ........................................ 370/81; 370/92
[58] Field of Search ........................ 370/81, 92, 80, 93

[56] References Cited

U.S. PATENT DOCUMENTS

| 3,541,456 | 11/1970 | Feder | 328/56 |
|---|---|---|---|
| 3,770,894 | 11/1973 | May, Jr. . | |
| 3,825,691 | 7/1974 | Honma et al. | 370/93 |
| 3,848,093 | 11/1974 | Edstrom | 370/81 |
| 3,971,891 | 7/1976 | Wolcott | 370/80 |
| 4,147,896 | 4/1979 | Cannon et al. | 179/15 AS |
| 4,153,816 | 5/1979 | Morgan . | |
| 4,295,217 | 10/1981 | Fennel, Jr. et al. | 370/81 |

FOREIGN PATENT DOCUMENTS 1375059 9/1964 France .
2093401 1/1972 France .

OTHER PUBLICATIONS

Overall Characteristics of a TASI System, by J. M. Fraser, D. B. Bullock, and N. G. Long, Bell System Technical Journal, Jul. 1962, pp. 1439 to 1473.
Digital TASI System in PCM Transmission, by K. Amano and C. Ota, IEEE International Conference on Communications, Jun. 9-11, 1969, Boulder, Colo., pp. 34-23 to 34-28.
A Speech Interpolation System for Private Networks, by J. M. Elder and J. F. O'Neill, Proceedings of the National Telecommunications Conference, 1978, pp. 14.6.1 to 14.6.5.

Primary Examiner—Marshall M. Curtis
Attorney, Agent, or Firm—Birch, Stewart, Kolasch & Birch

[57] ABSTRACT

One of the transmission facilities of a TASI system is used as an order wire, via which channel signalling information and assignment information are transmitted. Signalling information is transmitted periodically in frames on the order wire for only some of the channels, connected to the system, at any one time. Accordingly, the assignment information consists of both channel-to-facility assignment information, relating to the assignment of channels to the other facilities, and channel signalling assignment information, relating to the assignment of channels to signalling bit time channels in the frames on the order wire. One assignment can be transmitted in each frame, and frames not used for transmitting assignment information can be used for transmitting commands and messages. The system avoids the need to transmit multi-tone signals preceding speech bursts on the transmission facilities and avoids lengthy delays in the transmission of channel signalling information.

13 Claims, 10 Drawing Figures

TASI SYSTEM INCLUDING AN ORDER WIRE

This invention relates to a method of transmitting channel-to-facility assignment information and channel signalling information in a time assignment speech interpolation, or TASI, system in which signals from a plurality of channels are interpolated for transmission via a lesser plurality of transmission facilities, and to a TASI system utilizing this method.

In a TASI system, speech bursts on the individual channels are interpolated for transmission via fewer transmission facilities than there are channels. To enable the speech signals of each channel to be reconstituted at a receiver of the system, channel-to-facility assignment information, indicating which channels are assigned to which facilities, must also be transmitted to the receiver. In prior art systems this has been achieved by transmitting, preceding each speech burst, a multi-tone signal which identifies the output channel to which the speech burst is to be supplied. Disconnect signals are transmitted via a further transmission facility, referred to as an order wire, to disconnect the output channel prior to the next multi-tone signal preceding a following speech burst destined for another output channel. Each disconnection of an output channel must be effected at exactly the right time; if disconnection occurs too early the end of the preceding speech burst is clipped, whereas if disconnection occurs too late the start of the next multi-tone signal is supplied to the output channel resulting in an unpleasant noise being heard by the subscriber using the channel.

In Cannon et al U.S. Pat. No. 4,147,896 issued Apr. 3, 1979, there is disclosed a TASI system in which the order wire is dispensed with. To ensure disconnection of each output channel from a transmission facility before the arrival of the next multi-tone signal on the facility, this system provides fixed delays in the signal paths at the transmitter and the receiver during which delays the multi-tone signals are transmitted and detected.

It is also necessary for channel signalling information to be transmitted via a TASI system. Channel signalling information may comprise aulti-frequency, e.g. dual tone aulti-frequency or DTMF, signalling, which is transmitted via a TASI system in the same manner as speech signals; dial pulsing; and various other forms of pulsed signalling. In a TASI system such as that of the Cannon et al patent, pulsed signalling information such as dial pulsing is detected at the transmitter, each dialled digit is converted into a multi-tone signal which is transmitted via one of the transmission facilities, and the multi-tone signal is converted back into dial pulsing at the receiver. As the multi-tone signal can not be generated and transmitted until all of the dial pulses constituting a dialled digit have been received, this procedure involves a significant delay, of for example up to one second, in the transmission of the signalling information via the TASI system. Such delays in the transmission of signalling information can not be tolerated by some types of telephone equipment, e.g. PABX equipment using stop-go dialling, which may be connected to the TASI system, and can therefore result in call mishandling.

Accordingly, it can be seen that known TASI systems are subject to two difficulties, arising from the presence of multi-tone signals on the transmission facilities to denote channel assignments and arising from the delays to which channel signalling information can be subjected. The present invention seeks to provide an improved method of transmitting channel-to-facility assignment information and channel signalling information in a TASI system, and to an improved TASI system, in which these difficulties are largely mitigated or eliminated.

According to one aspect of this invention there is provided a method of transmitting channel-to-facility assignment and channel signalling information in a TASI system in which signals from a plurality of channels are interpolated for transmission via a lesser plurality of transmission facilities, comprising the steps of:- providing one of said facilities for the transmisslon of said information; defining time division multiplex frames, each frame comprising a plurality of time slots forming a first part of the frame and a plurality of time slots forming a second part of the frame; transmitting channel signalling information via said one facility during said first part of the frames; and transmitting channel-to-facility assignment information, relating to the assignment of said channels to the other facilities for said interpolated transmission, via said one facility during said second part of the frames.

Thus in the present invention said one of the transmission facilities constitutes an order wire, via which both channel-to-facility assignment information and channel signalling information are transmitted. As a result of the channel-to-facility assignment information being transmitted via the order wire, multi-tone signals need not be transmitted on the facilities preceding the speech bursts, so that the problems associated with the presence of such tones are avoided. As channel signalling information is also transmitted via the order wire, the long delays which can be associated with the transmission of such information in a system such as that of the Cannon et al patent are avoided, the system being virtually transparent to the channel signalling information as far as equipment connected to the system is concerned. Naturally, multi-frequency signalling is still transmitted in the same manner as speech signals.

The method of the invention is particularly suited to a TASI system for transmitting from 9 to 48 channels carrying speech signals via from 6 to 24 transmission facilities. However, the order wire may not have sufficient capacity for full transmission of the channel signalling information for up to 48 channels, as well as the channel-to-facility assignment information. Accordingly, preferably signalling information for only some of said channels is transmitted during said first part of each frame, the method including the steps of:- determining channels whose signalling information is to be transmitted via said one facility and assigning the determined channels to respective parts of the first part of the frames for transmission of their signalling information; transmitting channel signalling assignment information, relating to the assignment of said determined channels to said respective parts of said first part of the frames, via said one facility during said second part of the frames; delaying the signalling information of at least each of said determined channels; and transmitting the delayed signalling information of said determined channels during the respective parts of said first part of the frames.

In order to transmit signalling bits of each determined channel periodically, it is necessary for said respective parts of the first part of the frames to occur periodically in the frames. This is obviously the case if each of said respective parts consists of only one time slot in each frame. However, when each of said respective parts comprises a plurality of time slots in each frame, for transmission of a plurality of signalling bits of the relevant determined channel in each frame, each frame is preferably divided into its various parts so that the time slots of each of said respective parts of the first part of the frames occur periodically in the frames. Thus in each frame the time slots of said first part of the frame and those of said second part of the frame can be interleaved with one another throughout the frame.

The step of delaying the signalling information preferably includes the step of removing erroneous pulses from the signalling information during its delay. Thus erroneous pulses, which could be caused for example by contact bounce in electromechanical devices in equipment to which the TASI system may be connected, can be suppressed.

In order to enable errors in transmitted assignment information to be detected at a TASI system at the far end of the transmission facilities, preferably each frame further comprises a plurality of time slots forming a third part of the frame, the method including the step of producing and transmitting via said one facility during said third part of each frame checking information which is dependent upon the information of said second part of the respective frame.

The transmission facility provided as said one facility is preferably the best facility which is available. Accordingly, preferably the step of providing one of said facilities for the transmission of said information comprises the steps of:- selecting one of said facilities as said one facility; nonitoring the other facilities to determine an order of preference of said other facilities for use as said one facility; and in response to errors in information transmitted via the facility currently selected as said one facility, selecting a most preferred one of said other facilities as said one facility.

The invention also extends to a TASI system in which speech signals from a plurality of channels are interpolated for transmission via a lesser plurality of transmission facilities, said system comprising:-means for defining time division multiplex frames on one of said facilities; detecting means for detecting, in respect of each channel, speech signals to be transmitted; a buffer for storing said speech signals to be transmitted; control means for assigning each channel having speech signals to be transmitted to a respective one of the other facilities for transmission of said speech signals, and for producing channel-to-facility assignment information relating to the assignment; means for supplying the stored speech signals to be transmitted from the buffer to the respective facility for transmission; and transmitting means for transmitting channel signalling information and said channel-to-facility assignment information via said one facility during first and second parts, respectively, of said frames.

In a preferred embodiment of the system, said control means comprises means for determining each channel which has channel signalling information to be transmitted via said one facility, for assigning the determined channels temporarily to respective parts of said first part of the frames, and for producing channel signalling assignment information relating to each assignment; and said transmitting means comprises means for transmitting, via said one facility in said respective parts of said first part of the frames, signalling information of the determined channels, and for transmitting via said one facility said channel signalling assignment information in said second part of the frames.

When the channels and transmission facilities comprise telephone lines, as will generally be the case, the system preferably further includes means for converting analog signals incoming on said channels into digital signals for storage in said buffer, and for converting digital signals supplied from said buffer into analog signals for transmission via said other facilities.

The invention will be further understood from the following description with reference to the accompanying drawings, in which:-

Figure 1:
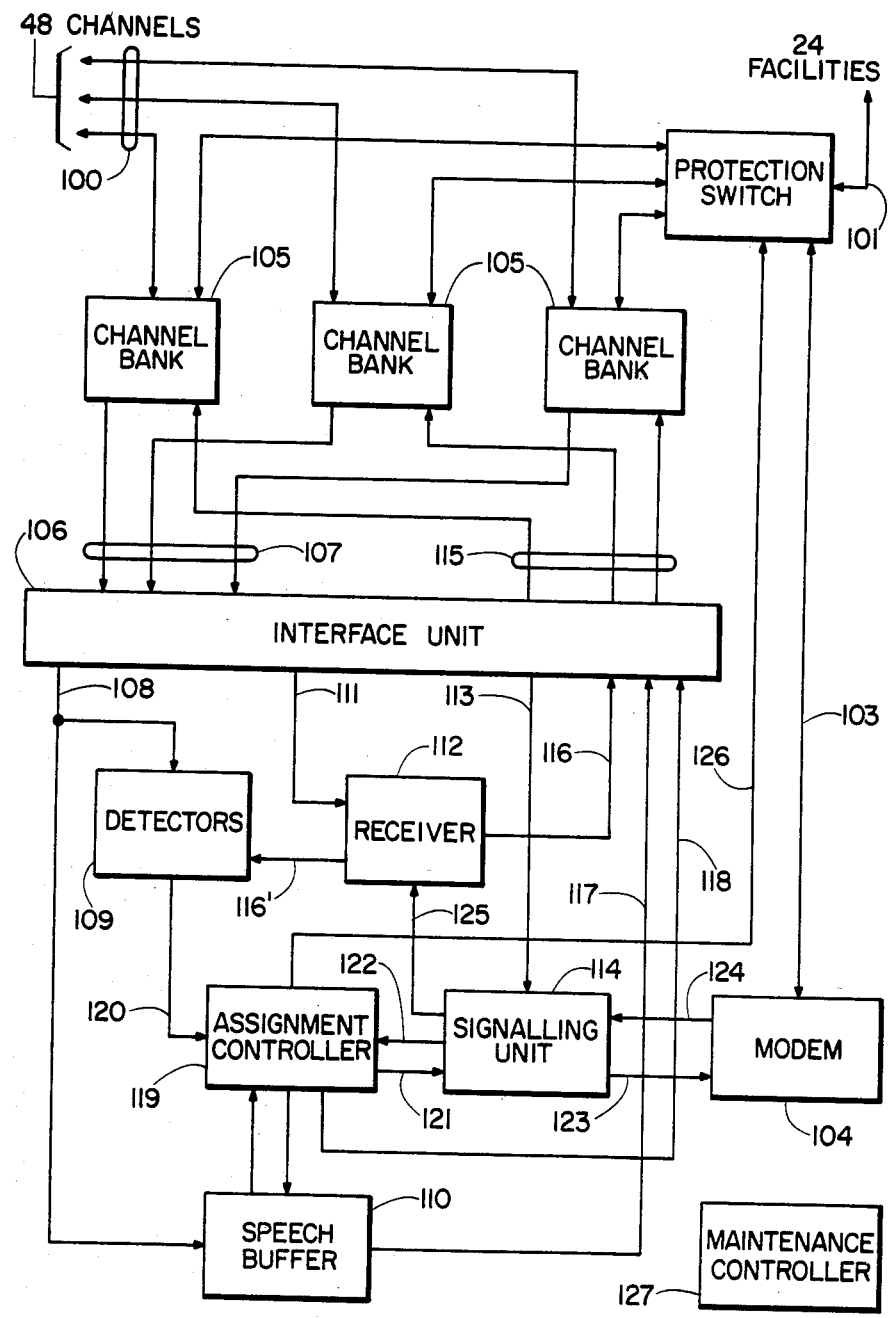
FIG. 1 shows in a block diagram a TASI system incorporating an embodiment of the invention.

FIG. 1 shows in a block diagram a TASI system which enables transmission of signals from up to 48 telephone channels 100, connected for example to a PABX (not shown), via up to 24 transmission facilities 101, e.g. telephone tie-lines connected at their far end (not shown) via another, similar, TASI system to another PABX. A protection switch 102 connects a selected one of the facilities 101, referred to herein as the order wire, via a line 103 to a 2.4 kb/s modem 104 as is further described below. The facilities 101 are coupled via the protection switch 102, and the channels 100 are coupled directly, to up to 3 channel banks 105, to each of which channel banks up to 16 channels 100 and up to 8 facilities 101 are connected. The channel banks 105 couple the channels 100 and facilities 101 to an interface unit 106.

Each channel bank 105 operates in known manner to convert between bi-directional voice frequency signals, on the channels 100 and facilities 101 to which it is connected, and two unidirectional 1.544 Mb/s digital bit streams (in the standard DS1 format) on lines leading to and from the interface unit 106. The use of each channel bank 105 for up to 16 channels and 8 facilities, rather than connecting all of the facilities to one channel bank and all of the channels to the other two channel banks, renders the TASI system readily adaptable to a wide range of requirements. Thus only one channel bank 105 can be used to transmit signals from up to 16 channels 100 via up to 8 facilities 101, or only two channel banks 105 can be used to transmit signals from 17 to 32 channels 100 via 9 to 16 facilities 101, or all three channel banks 105 can be used to transmit signals from 33 to 48 channels 100 via 17 to 24 facilities 101. In the following description it is assumed that 48 channels and 24 facilities are present, but it should be understood that this need not be the case.

The interface unit 106 is thus supplied via lines 107 with three incoming digital bit streams containing speech signals and signalling information from the channels 100 and speech signals from the facilities 101. The interface unit 106, as described in more detail below, supplies the speech signals from the channels 100 via lines 108 to a plurality of detectors 109 and a speech buffer 110, supplies the speech signals from the facilities 101 via lines 111 to a receiver 112, and supplies the signalling information from the channels 100 via a line 113 to a signalling unit 114. The interface unit 106 also supplies to the channel banks 105 via the lines 115 three outgoing digital bit streams containing speech signals and signalling information for the channels 100 and interpolated speech signals for the facilities 101. The speech signals and signalling information for the channels 100 are supplied combined with one another from the receiver 112 via lines 116, as further described below. Interpolated speech signals for the facilities 101 are supplied to the interface unit 106 from the speech buffer 110 via lines 117. The signalling information for the channels 100 can be over-ridden by simulated signalling information signals supplied to the interface unit 106 via a line 118 from an assignment controller 119.

The interface unit 106 includes a 6.176 MHz crystal controlled oscillator, from which timing signals are derived for controlling the various parts of the TASI system. These timing signals, and various control signals, are supplied between the parts of the system via lines which are not shown in FIG. 1 for the sake of clarity. In particular, these timing signals control the timing of the 1.544 Mb/s bit streams transmitted between the channel banks 105 and the interface unit 106. As is known, these bit streams consist of 125 $\mu s$ frames each comprising a frame bit and an 8-bit signal sample of each of 24 voice frequency channels. During each frame, the interface unit 106 supplies to the lines 108, and receives from the lines 116, an 8-bit signal sample in respect of each of the 48 channels 100, each 8-bit signal sample being presented in parallel on the lines 108 or 116 during a 2.6 $\mu s$ period during which the interface unit produces a 6-bit address ADD which identifies the respective channel. Similarly, during each frame the interface unit 106 supplies to the lines 111, and receives from the lines 117, an 8-bit parallel signal sample in respect of each of 23 of the 24 facilities 101, each sample being presented on the lines 111 or 117 during a 5.2 $\mu s$ period during which 5 of the 6 bits of the address ADD identify the respective facility 101.

Under the control of the assignment controller 119, speech bursts from the 48 channels on the lines 108 are buffered and interpolated by the speech buffer 110 to produce interpolated speech signals on the lines 117. The detectors 109, each of which is time-shared among the 48 channels under the control of the address ADD, serve to supply via lines 120 to the assignment controller 119 signals ACT and DAT which indicate respectively whether each channel is active and whether each channel is carrying data. To this end the detectors 109 comprise a data detector for detecting data signals on the lines 108; in response to detected data the signal DAT is produced and the assignment controller 119 assigns the respective channel permanently to one of the facilities 101 to effect transmission of the data without interpolation with speech bursts, until the end of the data signals. The detectors 109 also comprise a speech detector for detecting speech signals on the lines 108, and an echo detector for detecting whether such speech signals are echoes of signals on the lines 116', which signals correspond to signals on the lines 116 as further described below. The signal ACT is produced, representing that a channel is active or is carrying speech to be transmitted, if speech signals which are not echoes are detected.

The buffering by the speech buffer 110 serves to delay signal samples to be transmitted for a short time to accommodate the response time of the speech detector without clipping of speech signals, to allow time for a free facility 101 to be found, and to allow time for channel-to-facility assignment information, which indicates to the TASI system at the far end of the facilities 101 which channel is assigned to which facility for each speech burst, to be transmitted via the order wire at the start of each speech burst.

As the present invention is concerned with the transmission of information via the order wire, and the above brief description of the speech buffer 110 and the detectors 109 is sufficient for a full understanding in this respect, these units are not described further here. The speech buffer 110 forms the subject of co-pending U.S. Pat. No. 218,756, entitled "Buffering Speech Signals in a TASI System", filed simultaneously herewith, the entire disclosure of which is incorporated herein by reference.

The assignment controller 119 supplies channel-to-facility assignment information to the signalling unit 114 via lines 121. Channel signalling (e.g. dial pulsing) information is supplied to the signalling unit 114 via the line 113, and after at least partial correction of faults, e.g. due to contact bounce of electromechanical devices to which the channels 100 may be connected, this signalling information is forwarded to the assignment controller 119 via a line 122. The signalling unit 114 serves for transmitting both the channel-to-facility assignment information and channel signalling information via a line 123, the modem 104, the line 103, the protection switch 102, and the selected one of the facilities 101 which constitutes the order wire. However, the bit rate of 2.4 kb/s provided by the modem 104 is insufficient to accommodate both the channel-to-facility assignment information and signalling information from all 48 channels simultaneously. It has been determined that the probability of more than 10 of 48 channels dialling simultaneously is relatively small, typically less than 1%. Accordingly, in the present system signalling information from only 10 of the 48 channels is transmitted via the order wire at any one time.

In order to enable the TASI system at the far end of the facilities 101 to distribute the signalling information transmitted via the order wire correctly among the channels, it is necessary to transmit information as to which channels have been allowed to transmit signalling information. This information is referred to below as channel-to-signalling assignment information, and is also supplied by the assignment controller 119 via the lines 121 to the signalling unit 114 and transmitted via the order wire as described fully below.

In addition to the assignment information referred to above, the assignment controller 119 can supply to the signalling unit 114 other information, such as commands and messages, for transmission via the order wire, as described below. The unit 114 delays the signalling information which it transmits to allow time for the channel-to-signalling assignment information to be transmitted first, thus avoiding clipping of signalling information in much the same manner as the speech buffer 110 enables clipping of speech signals to be avoided.

Information transmitted via the order wire from the far end TASI system is supplied via the protection switch 102, line 103, modem 104, and a line 124 to the signalling unit 114. Via lines 125, received channel signalling and assignment information is used to enable the receiver 112 to produce the signals on the lines 116 for transmission on the channels 100 from the interpolated signals received via the lines 111, as is further described below.

The protection switch 102, as already described, couples the line 103 to the facility 101 which is selected to constitute the order wire. The switch 102 can comprise relays or other suitable switching devices. Initially any one of the facilities 101 is selected as the order wire. During operation of the TASI system, during periods of low system activity tests are performed on all of the other facilities to establish an order of preference of these for use as the order wire. In the event of failure of or frequent errors on the facility currently selected as the order wire, via lines 126 the assignment controller 119 causes the switch 102 to couple the line 103 to the most preferred facility which then becomes the order wire, the facility previously used as the order wire becoming the least preferred of the other facilities.

In addition to the units already briefly described, the TASI system comprises a maintenance controller 127, which is connected to various other parts of the system, such as the receiver 112, the signalling unit 114, and the assignment controller 119, via lines which are not shown in FIG. 1 for the sake of clarity. The maintenance controller 127 carries out routine procedures such as measurement and testing of the facilities 101 to determine, for example, noise and signal levels on the facilities. As these routine procedures are not essential for operation of the TASI system and are not directly relevant to the present invention, the maintenance controller 127 and its operation are not described further here.

Figure 2:
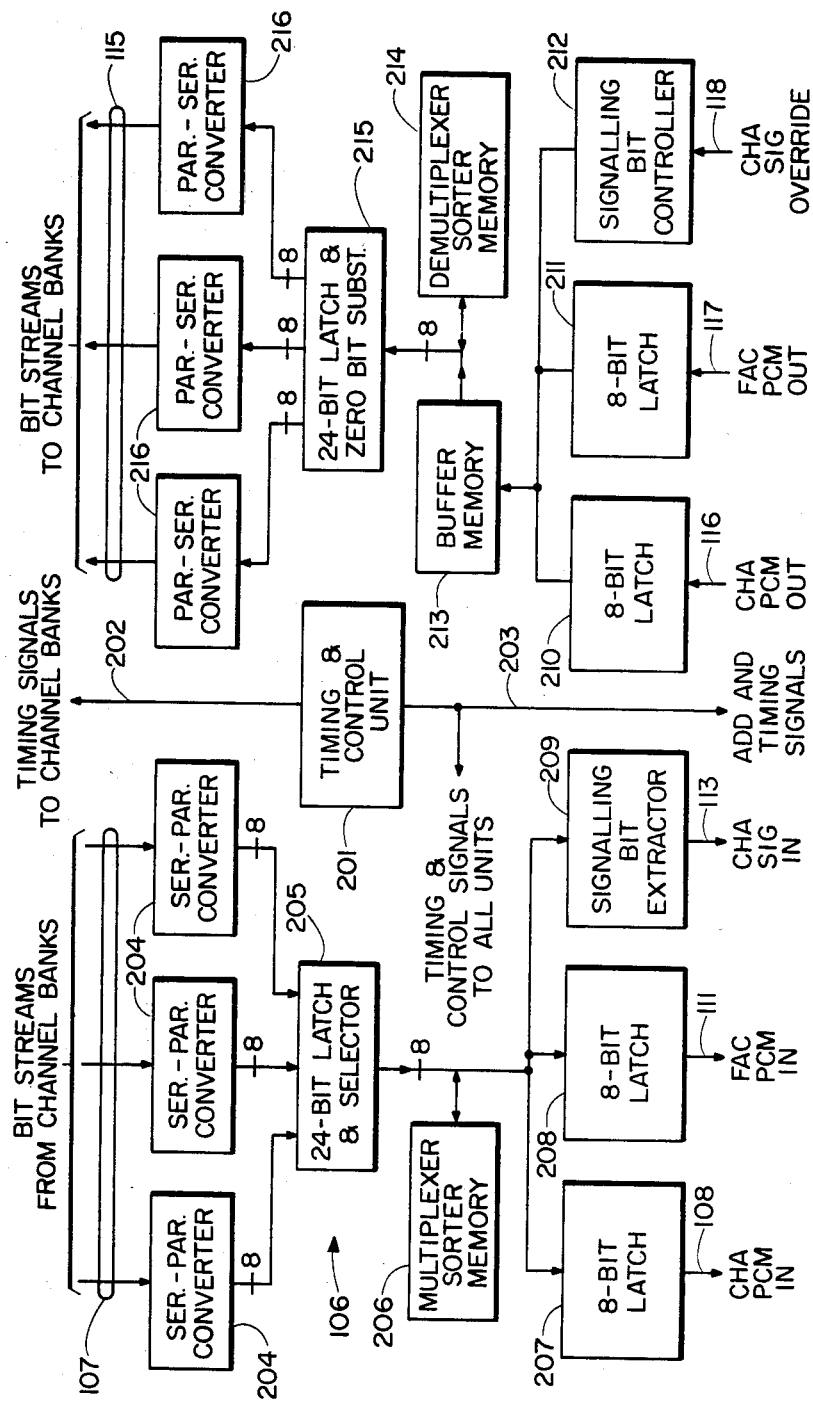
FIG. 2 illustrates an interface unit of the system.

The interface unit 106, which is shown in more detail in FIG. 2, includes a timing and control unit 201 which includes the crystal-controlled oscillator already referred to and which supplies timing signals to the channel banks 105 via lines 202, the address ADD and timing signals to the rest of the TASI system via lines 203, and timing and control signals including the address ADD to the other parts of the unit 106. As shown to the left of the unit 201 in FIG. 2, the interface unit 106 comprises three serial-to-parallel converters 204, a 24-bit latch and selector 205, a multiplexer sorter memory 206, two 8-bit latches 207 and 208, and a signalling bit extractor 209, for producing signals on the lines 108, 111, and 113 from the bit streams on the lines 107. As shown to the right of FIG. 2, the interface unit 106 comprises two 8-bit latches 210 and 211, a signalling bit controller 212, a buffer memory 213, a demultiplexer sorter memory 214, a 24-bit latch and zero bit substitution circuit 215, and three parellel-to-serial converters 216 for producing the bit streams on the lines 115 from the signals on the lines 116 to 118. Each of the memories 206, 213, and 214 is constituted by a random access memory (RAM). All of the units 204 to 216 are controlled by the timing and control unit 201 to operate as described below.

Each serial bit stream on a line 107 is converted by a respective converter 204 into 8-bit parallel PCM words occurring approximately every 5.2 $\mu$s. The three 8-bit words produced simultaneously every 5.2 $\mu$s by the converters 204 are latched by the latch and selector 205 and are entered sequentially, one word at a time, into the aemory 206. During the next 125 $\mu$s frame, during each of the 48 addresses ADD each lasting 2.6 $\mu$s the 8-bit PCM word stored in the memory 206 for the respective one of the 48 channels 100 is read out from the memory 206 and via the 8-bit latch 207 to the lines 108. Also during this frame, the 8-bit PCM word stored in the memory 206 for each of the facilities 101, which are also identified by the addresses ADD, is read out from the memory 206 via the 8-bit latch 208 to the lines 111. The signalling bit extractor 209 extracts the signalling bits from the 8-bit words read out from the memory 206 in respect of the channels 100 and produces these serially on the line 113.

Conversely, 8-bit PCM words, which include signalling information, on the lines 116 destined for the channels 100, and 8-bit PCM words on the lines 117 destined for the facilities 101, are supplied during the respective addresses ADD via the latches 210 and 211 respectively and the buffer memory 213 and are entered into the memory 214. The signalling bits contained in the words on the lines 116 can be modified by the assignment controller 119, as described above, via the line 118 and the signalling bit controller 212. The buffer memory 213 provides a delay of almost 1 frame (125 $\mu$us) to provide the PCM words at the correct times for writing into the memory 214. During the next frame, the words are read out from the memory 214 sequentially to the circuit 215, from which the words are supplied three at a time to the three converters 216 to produce the three serial bit streams on the lines 115.

Figure 3:
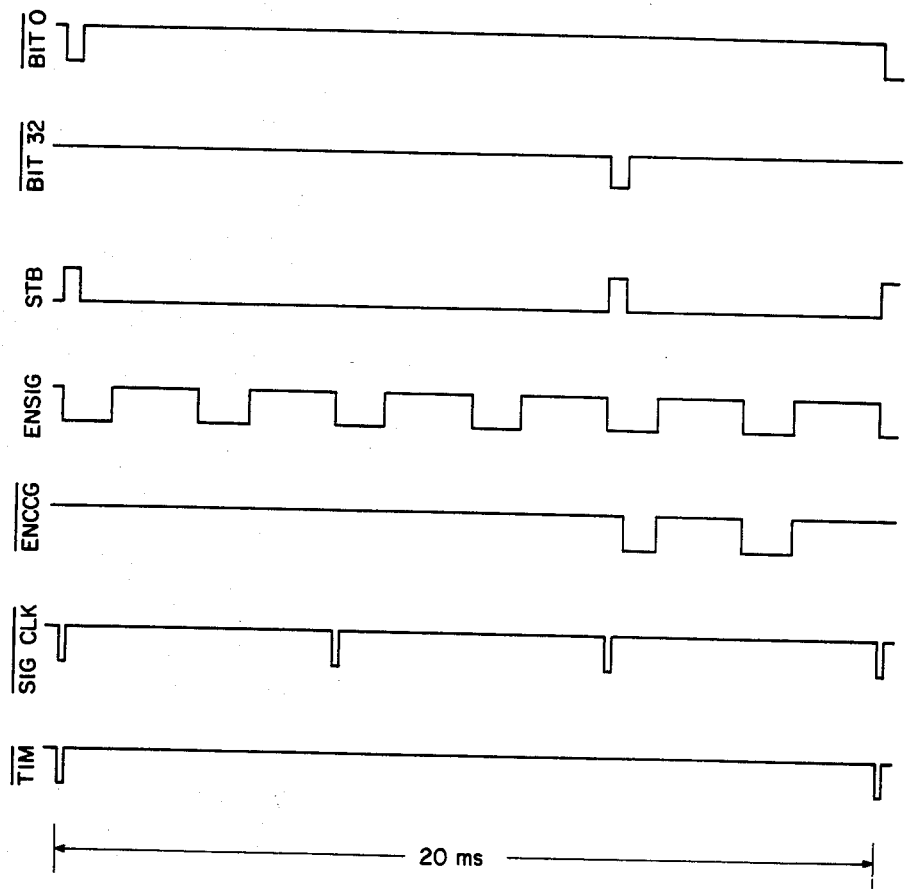
FIG. 3 illustrates a transmission format on an order wire of the system and also shows timing signals which occur in operation of a signalling unit of the system.

Before describing the receiver 112, signalling unit 114, and assignment controller 119 in more detail, the transmission format on the order wire is described. Transmission of information via the order wire is effected bit-serially at 2.4 kb/s in frames each of 48 bits 0 to 47, each frame having a duration of 20 ms. FIG. 3 illustrates timing signals which occur in one frame, and shows in the line labeled "SIGNAL" the information content of the bits 0 to 47 of the frame. This information is identified as follows:-

Bit 0 in each frame is a frame bit F which is alternately 1 and 0 in successive frames.

Bits 1, 2, 8, 9, 10, and 16 in each frame are C bits C1 to C6, which form a 6-bit word which has $2^6 = 64$ combinations, 48 of which are used each as a channel number corresponding to one of the 48 addresses ADD to identify the respective channel 100.

Bits 17, 18, 24, 25, 26, and 32 in each frame are A bits, A1 to A6, which form a 6-bit word which likewise has 64 combinations, 24 of which are used each as a facility number to identify a repective one of the 24 facilities 101, and another 10 of which are used each as a number to identify a respective one of 10 signalling bit time channels described below.

The remaining combinations of the A bits in conjunction with 12 of the remaining combinations of the C bits are used for the transmission of commands and tests. The 4 remaining combinations of the C bits all have each of bits C1, C2, C3, and C4 as a logic 1; these logic-1 bits are used as a code to indicate that the following C and A bits, i.e. the bits C5, C6, and A1 to A6, constitute an 8-bit byte of a message rather than the information indicated above.

Bits 33, 34, 40, 41, and 42 in each frame are five P bits, P1 to P5, which are check bits for the 12 A and C bits transmitted earlier in the same frame. These check bits are generated using a known cyclic code, and provide for detection of all odd-numbered errors and 2 and 4 bit errors in the A and C bits, as well as detection of many higher-even-numbered errors in these bits. As is well known, errors in signals transmitted via telephone facilities generally occur in bursts. In view of this, in the frame format groups of three bits constituted by the F, C, A, and P bits are separated by groups of 5 S bits described below. Consequently, in order to produce a 6-bit error in the A and C bits, which is the minimum error which can go undetected using the check bits, an error burst must last for at least 11 bits. Individual errors which may occur in the S bits can be detected and corrected easily as described below.

The remaining 30 bits in each frame are S bits, S0 to S9, S0' to S9', and S0" to S9", which form the 10 signalling bit time channels already referred to. The nth signalling bit time channel is formed by the bits Sn, Sn', and Sn", where n is any whole number from 0 to 9. Each signalling bit time channel is thus formed by three bits in each frame, and as will be seen from a careful consideration of the frame format the bits of each signalling bit time channel occur periodically every 6.66 ms. Thus for each of the 10 channels 100 which are assigned signalling bit time channels on the order wire, a signalling bit is transmitted every 6.66 ms. The transmitted signalling bits are derived from signalling information on the line 113 which is updated every 1.5 ms ($12 \times 125$ μs), so that there is some loss of definition in the signalling information which is transmitted via the order wire. Compensation for this loss of definition, and correction of individual errors in the S bits as mentioned above, can be provided by circuitry in a 20 ms delay unit which is provided in the signalling unit 114 for the received S bits. Such circuitry can be similar to circuitry described below and provided for correction of S bits which are to be transmitted.

It will thus be seen that, in each frame on the order wire, signalling information for 10 of the channels 100 can be transmitted. In addition, by transmitting a channel number in the C bits and a facility number or signalling bit time channel number in the A bits, a single channel-to-facility or channel-to-signalling assignment can be transmitted. Alternatively, a command or message can be transmitted using these A and C bits. In view of the various types of information which can be transmitted in any one frame, the following priority order is adopted:-
1. Retransmission of previous frame upon command from far end - highest priority.
2. Command to far end to retransmit previous frame containing error.
3. Channel-to-signalling assignment.
4. Channel-to-facility assignment.
5. Synchronization word (frame count>48).
6. Messages.
7. Repetition of assignment previously transmitted.
8. No operation—lowest priority.

As can be seen from this order, the transmission of channel-to-signalling assignments has a higher priority than the transmission of channel-to-facility assignments, in order to ensure that signalling information such as dial pulsing is not unduly delayed. Still higher priorities are provided for a command to the TASI system at the far end of the facilities 101 to retransmit a previous frame in which an error has been detected, and for the retransmission of such a frame to the far end in response to such a command being received from the far end. In order to enable retransmission of previous frames when required, the assignment controller 119 stores the 64 previously transmitted frames, each stored frame being identified by a frame count which is transmitted as part of the retransmit command. In order to ensure consistency between the frame counts in the assignment controller 119 and the signalling unit 114 at the far end of the facilities 101, a synchronization word, which serves to reset the count at this far end signalling unit as described below, is transmitted with a relatively low priority after the frame count has reached 48. In order of continued decreasing priority, messages are transmitted in the frames on the order wire, then repetitions of previously transmitted assignments, which serve as a further check against errors, and finally a command indicating that no operation is taking place.

Assuming that 48 channels 100 and 24 transmission facilities 101 are present, and that the average speech burst length is 1.2 seconds, then it is necessary to transmit 23 channel-to-facility assignments every 1.2 seconds, or about one channel-to-facility assignment every 3 frames. Assuming that on average another one in every 3 frames is used for channel-to-signalling assignment, synchronization words, retransmitted frames and retransmit commands, there is about one frame in every 3 frames available for messages, corresponding to a bit rate of 8 bits per $3 \times 20$ ms, or about 133 b/s. The message bit rate may be higher than this, up to about 400 b/s if almost all of the frames are used for message transmission.

Figure 4:
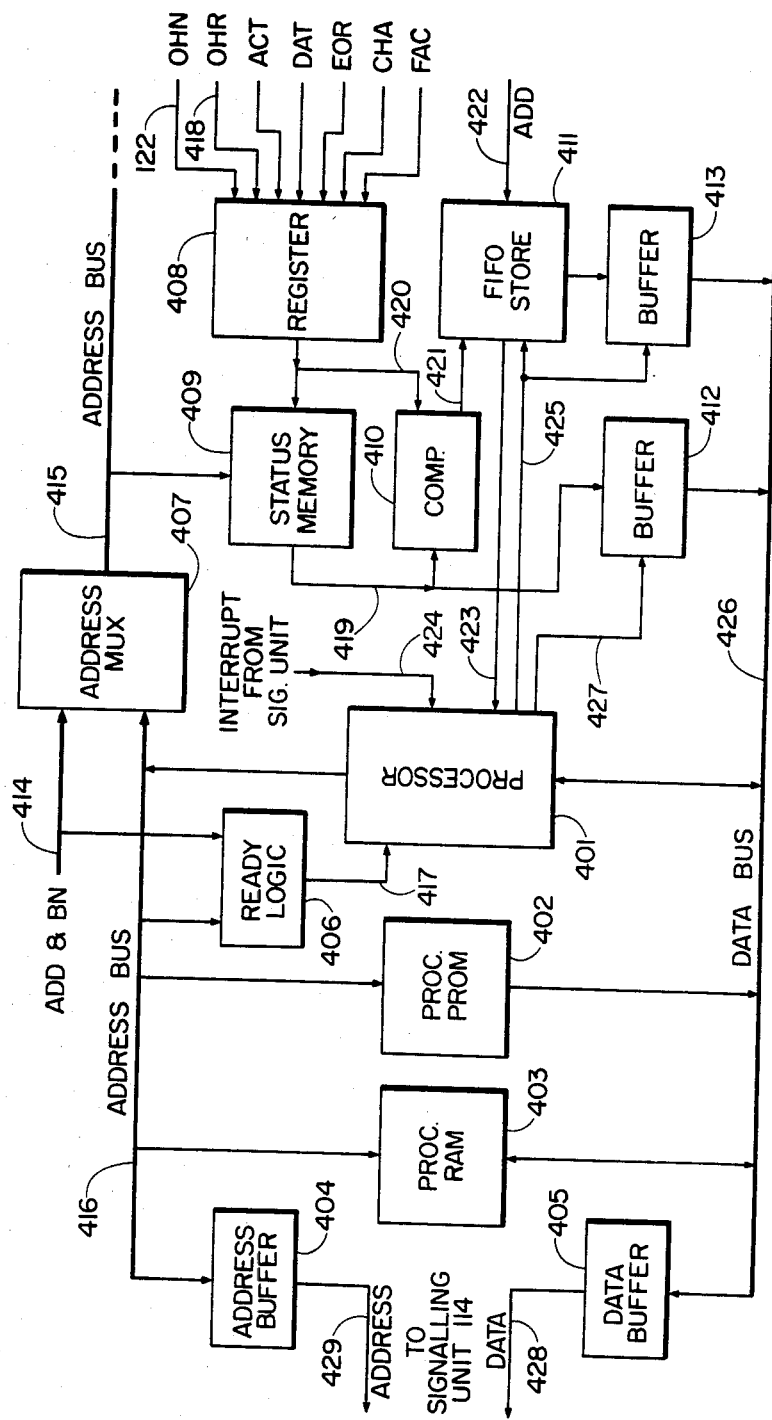
FIG. 4 illustrates part of an assignment controller of the system.

Referring now to FIG. 4, the manner in which assignment information is produced by the assignment controller 119 is decribed. The assignment controller includes a processor 401, associated program and data memories constituted respectively by a PROM 402 and RAM 403, address and data buffers 404 and 405 respectively, a ready logic unit 406, an address multiplexer 407, a register 408, a status memory 409, a comparison logic unit 410, a first-in first-out (FIFO) store 411, and buffers 412 and 413. Other parts of the assignment controller 119, for example associated with control of the speech buffer 110, are not shown or described here.

The processor 401 is an Intel type 8085A microprocessor which is supplied with a 9 MHz clock signal to operate asynchronously with respect to the address ADD and a bit number BN which are supplied via a bus 414 to the address multiplexer 414. The bit number BN is a 3-bit number which identifies the 8 clock periods of a 3.088 MHz clock signal, produced by the interface unit 106, which occur during the 2.6 μs period of each address ADD. During so-called processor access times, which are the 4th and 8th of these clock periods, the multiplexer 407 supplies to an address bus 415 addresses which are supplied by the processor 401 and which are present on an address bus 416. At other times the multiplexer 407 supplies the address ADD from the bus 414 to the address bus 415. In the event that the processor 401 supplies to the bus 416 an address which is destined for the address bus 415 at a time other than during a processor access time, or too late during a processor access time for the addressing operation to be completed before the end of the processor access time, this is detected by the ready logic unit 406 which via a line 417 stops the processor 401 until the next processor access time.

During each address ADD on the bus 414, the register 408 is supplied with and stores status signals OHN, OHR, ACT, DAT, EOR, CHA, and FAC, these signals subsequently being stored for each channel in the status memory 409 at the address ADD supplied via the bus 414, multiplexer 407, and address bus 415. The signals ACT and DAT have already been described. The signal OHN denotes the hook status of the near end subscriber of the channel, and is constituted by the signal on the line 122. The signal OHR denotes the hook status of the far end subscriber of the channel, and is supplied via a line 418 from the receiver 112 as described below. The signal EOR is supplied by the speech buffer 110 and denotes the end of record of speech stored in the speech buffer. The signal CHA denotes whether a channel unit for the channel having the address ADD is present in one of the channel banks 105. Similarly, the signal FAC denotes whether a channel unit for the facility 101 having the address ADD is present in one of the channel banks 105.

The comparison logic unit 410 comprises a plurality of Exclusive-OR gates and NAND gates which, for each address ADD, compare the previously stored status signals supplied from the status memory 409 via lines 419 with the current status signals supplied by the register 408 via lines 420. In the event of there being any difference between the compared status signals the unit 410 supplies a load signal via a line 421 to the store 411. In response to the load signal the store 411 stores the address ADD, with which it is supplied via lines 422, and supplies an interrupt signal via a line 423 to the processor 401. Meanwhile the new status signals are stored in the status memory 409. An exception to this sequence occurs in the case of dial pulsing; in this situation after an initial interrupt signal has been supplied to the processor 401 via the line 423 in response to the signal OHN changing to indicate that the channel's subscriber is off hook, the generation of further load signals on the line 421 in respect of this channel is suppressed within the logic unit 410 for a predetermined period, thereby allowing time for dialling without generating an excessive number of interrupts to the processor due to the dial pulses. This suppression is effected by means of one of the NAND gates in the unit 410 as described above. A similar suppression can be effected in the same manner in respect of other status signals, as desired.

The processor 401 handles interrupt signals supplied via the line 423, and higher priority interrupt signals supplied from the signalling unit 114 via a line 424 as further described below, in order of priority and in its own timing. In response to an interrupt signal on the line 423, the processor 401 supplies a read signal via a line 425 to the store 411 and the buffer 413, in response to which an address ADD corresponding to a channel number is read out from the store 411 via the buffer 413 and a data bus 426 to the processor 401. The processor 401 adds to the read-out address a prefix identifying the status memory 409, and during the next processor access time addresses the status memory 409 via the address bus 416, multiplexer 407, and address bus 415, and supplies an enable signal to the buffer 412 via a line 427. In consequence the new status signals for the particular channel are read out from the status memory 409 via the lines 419 and the buffer 412 to the data bus 426. The processor 401 also addresses its RAM 403 to read out a previously stored record of the channel's status signals, and compares these with the new status signals from the status memory 409 to determine which signal has changed. The processor 401 then stores the new status signals in the RAM 403 in place of the previously stored status signals.

The processor 401 stores signals in queues in its RAM 403 in dependence upon the change in the status signals. For example, if the signal OHN has changed indicating that a channel has gone off-hook, the channel number is stored in a queue of channels awaiting assignment of a signalling bit time channel. Subsequent dial pulses on the channel are delayed in the signalling unit 114, as already mentioned, to allow such assignment to be effected. If the channel carries inband signalling, such as MF (multi-frequency) tones or DTMF (dual tone multi-frequency) signalling, rather than dial pulses, this is transmitted via the speech buffer 110 in the same manner as speech. In this case the signal ACT changes in response to the presence of tones, and the channel number is stored in a queue of channels awaiting assignment of a facility. For the first speech burst of a channel which has just gone off-hook, the channel is given priority over other channels awaiting assignment of facilities for speech bursts, to ensure that inband signalling is accorded a higher priority than speech bursts.

The processor 401 also provides in its RAM 403 other queues, for example of messages and available signalling bit time channels, and tables which store for example the current channel-to-signalling and channel-to-facility assignments. The previously transmitted frames already referred to are also stored in the RAM 403. A signalling bit time channel is considered to be available for reassignment a predetermined time after the last hook transition of the channel previously assigned to the signalling bit time channel. In the case of both channel-to-signalling and channel-to-facility assignments, the assignment is only terminated on transmission of a new assignment of the signalling bit time channel or the facility, respectively.

In response to an interrupt signal from the signalling unit 114 on the line 424, the processor 401 loads into an output port of the RAM 403 the channel numbers of the 10 channels which are currently assigned to the signalling bit time channels, this information being taken from the channel-to-signalling assignment table, as well as the A and C bits already described, these bits being determined by the processor 401 in accordance with the above-described priority order and in dependence upon the queued information in the RAM 403. For example, in the case of a channel-to-signalling assignment, the A bits are constituted by the number of the next available signalling bit time channel and the C bits are constituted by the channel number of the next channel awaiting a signalling bit time channel assignment, taken from the respective queues. The information in the outport port is subsequently transferred to the signalling unit 114 via the data bus 426, the data buffer 405, and the data lines 428 together with addresses supplied via the address bus 416, address buffer 404, and address lines 429, to be entered into the signalling unit 114 as further described below.

Figure 5:
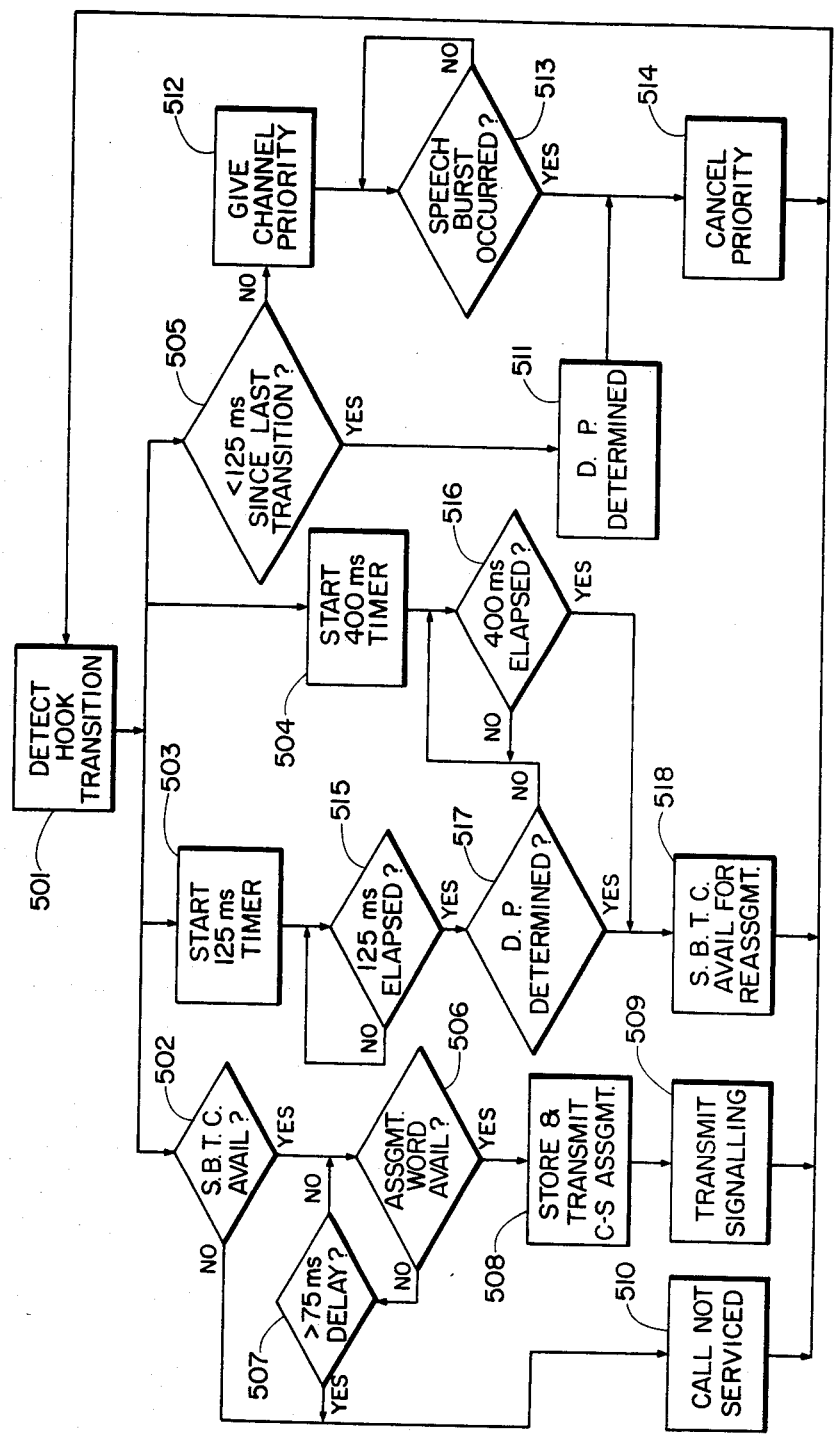
FIGS. 5 and 6 show flow charts relating to the operation of the assignment controller.
Figure 6:
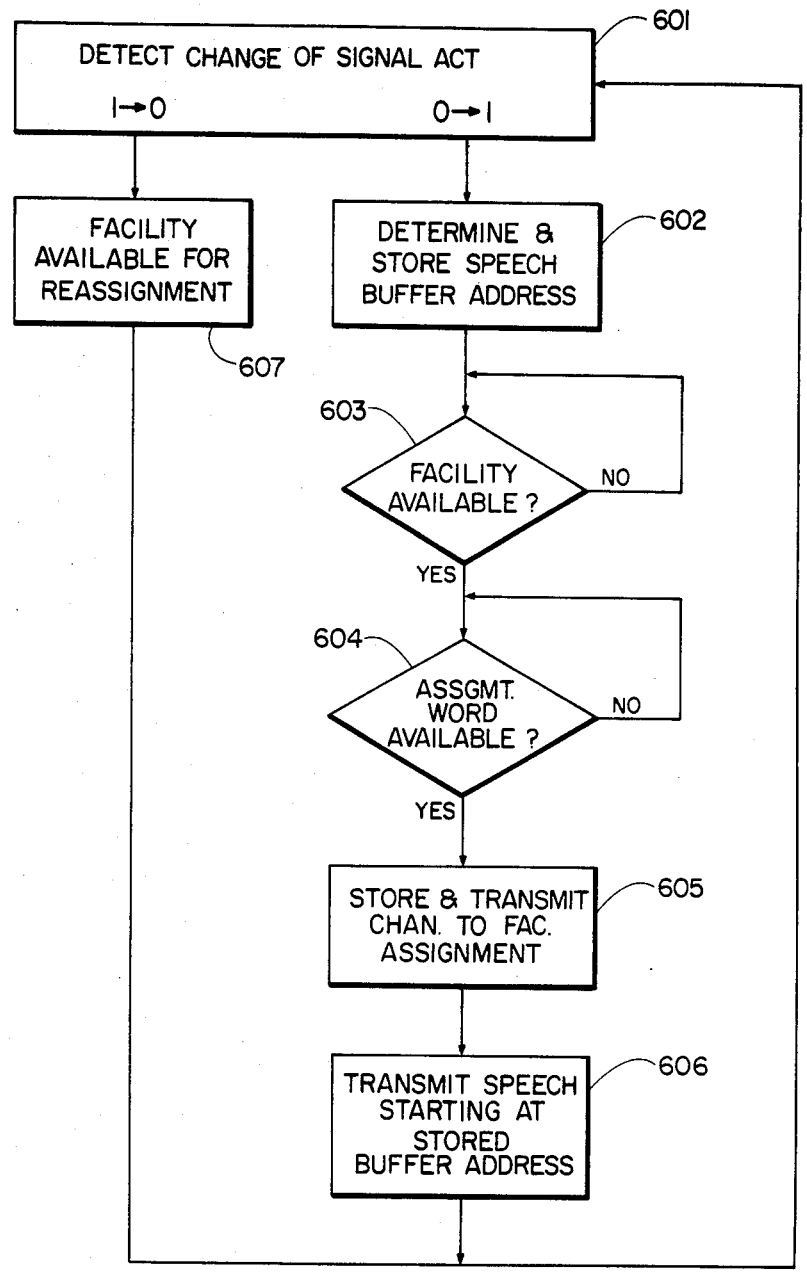

The operation of the assignment controller 119 will be further understood from the following description with reference to the flow charts shown in FIGS. 5 and 6. The sequences shown in these figures occur in respect of each channel in response to a detected hook transition (FIG. 5) or a detected change of the signal ACT (FIG. 6) for the particular channel.

Referring to FIG. 5, in response to a hook transition, or change in level of the signal OHN, detected in a block 501, a determination is made (block 502) as to whether or not a signalling bit channel (S.B.T.C.) is available for transmission of signalling information for the particular channel, a 125 ms timer and a 400 ms timer are each started or restarted (blocks 503 and 504), and a determination is made (block 505) as to whether or not less than 125 ms has elapsed since the last hook transition of the same channel.

If a signalling bit time channel is available, as determined in block 502, then in blocks 506 and 507 a determination is made as to whether an assignment word is available (i.e. whether A and C bits can be transmitted, in accordance with the described priority scheme, in a frame on the order wire) either immediately or within 75 ms. If so, in a block 508 a channel-to-signalling assignment, consisting of the channel number and the number allocated to the signalling bit time channel which is available, is stored in the RAM 403 and is transmitted in a frame on the order wire, followed by transmission of the signalling information itself, as described below, at block 509. Alternatively, if no signalling bit time channel is available or if no assignment word becomes available within 75 ms, then as indicated at block 510 the call originating with the hook transition is not serviced. A longer delay than 75 ms could entail clipping of signalling information, resulting in misplaced calls.

If a hook transition occurs within 125 ms of a previous hook transition, as determined at block 505, then at a block 511 it is determined that dial pulsing (D.P.) exists on the channel. In the absence of the dial pulsing determination, a hook transition occurring more than 125 ms after a previous hook transition could denote a channel going off-hook prior to transmitting inband signalling information. To accommodate this, in a block 512 the channel is given priority for a channel-to-facility assignment over other channels carrying speech signals. When the first speech burst (which may comprise inband signalling information) has occurred, as determined in a block 513, or if dial pulsing is determined at block 511, this priority for a channel-to-facility assignment is cancelled in a block 514.

The ends of 125 ms and 400 ms periods from the last hook transition which occurred are determined at blocks 515 and 516 respectively. Depending upon whether or not dial pulsing has been determined in block 511, as indicated by block 517, either 125 ms (dial pulsing determined) or 400 ms (dial pulsing not determined) after the last hook transition the signalling bit time channel is considered to be available for re-assignment, at a block 518. The signalling bit time channel is not re-assigned, however, until it is required and a new channel-to-signalling assignment is transmitted.

Referring to FIG. 6, in response to the signal ACT changing from 0 to 1, indicating the start of a speech burst or inband signalling information to be transmitted, being detected at a block 601, in a block 602 an address in the speech buffer 110 denoting the start of the speech burst or information is determined and stored. In blocks 603 and 604 determinations are made as to when a facility 101 is available and when an assignment word is available (i.e. when A and C bits can be transmitted, in accordance with the described priority scheme, in a frame on the order wire). Following these determinations, in a block 605 a channel-to-facility assignment, consisting of the channel and available facility numbers, is stored in the RAM 403 and is transmitted in a frame on the order wire, followed by transmission of the speech burst or inband signalling information itself via the assigned facility, commencing from the stored speech buffer address, as indicated by a block 606. If a facility 101 or an assignment word is not available, as determined by blocks 603 and 604, then up to 1 second of speech or information is stored in the speech buffer 110, after which an over-writing of signals stored in the speech buffer 110 takes place. This arrangement provides for a maximum of 1 second of speech or information to be stored in the speech buffer 110 for any one channel; a greater delay than this in gaining an available facility and transmitting a channel-to-facility assignment results in speech or information clipping.

After a desired hangover period determined in the speech detector, the signal ACT changes from 1 to 0 at the end of a speech burst or inband signalling information. In response to detection of this at block 601, in a block 607 the facility is considered to be available for re-assignment. The facility is not re-assigned, however, until it is required and a new channel-to-facility assignment is transmitted.

Figure 7A:
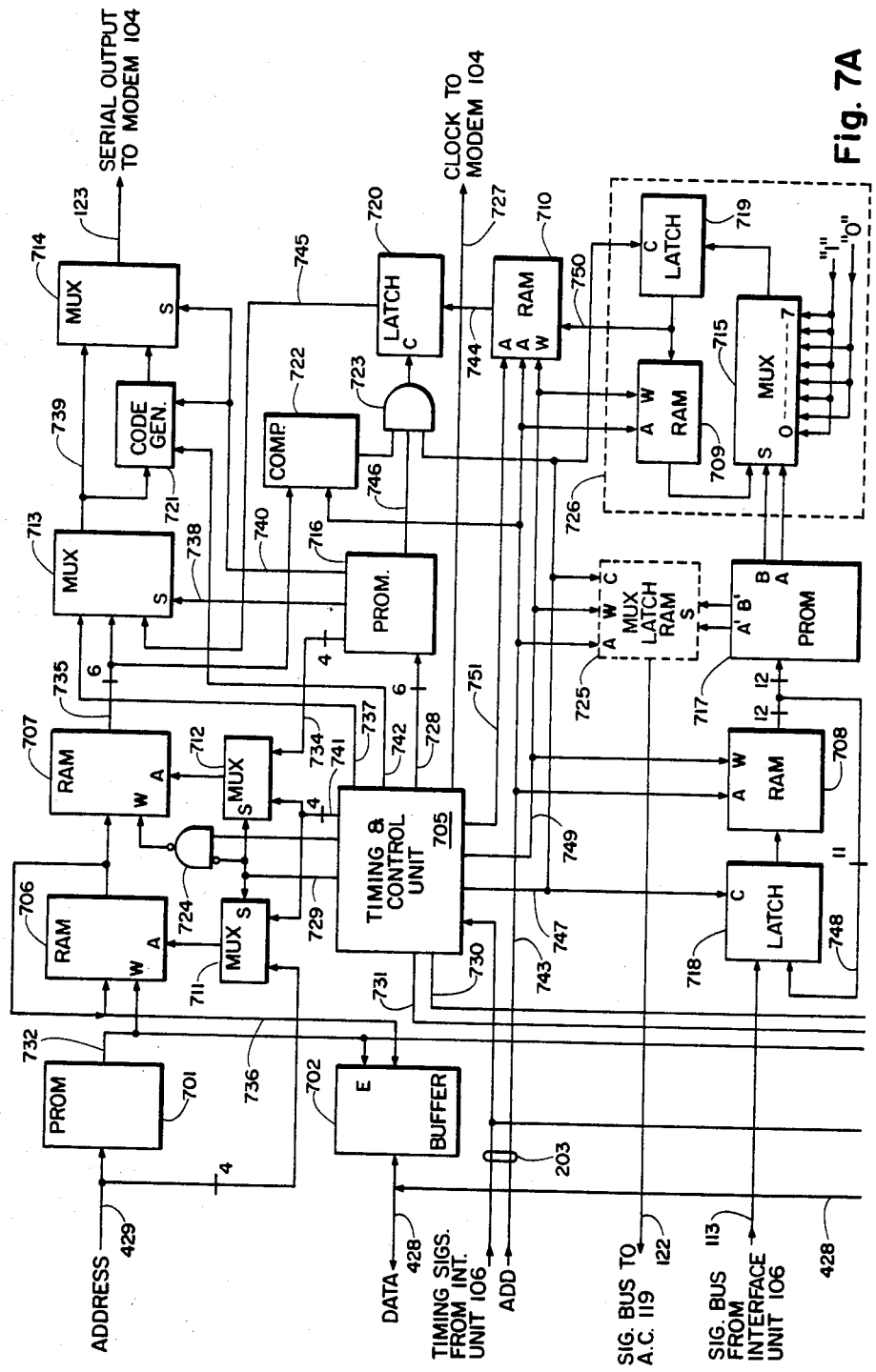
FIGS. 7A and 7B illustrate the signalling unit of the system.
Figure 7B:
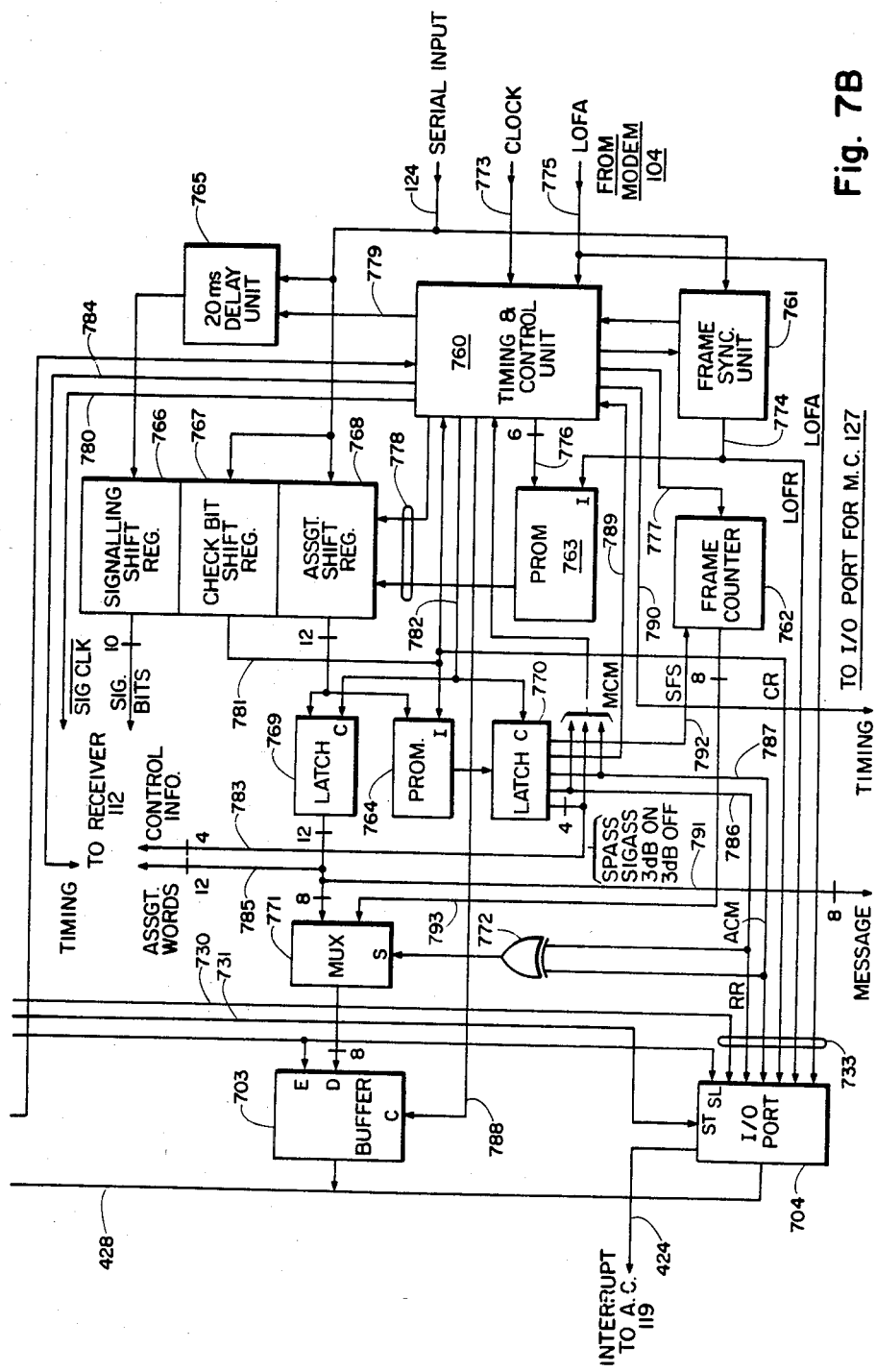

FIGS. 7A and 7B show in detail the signalling unit 114, and generally relate respectively to the transmission and reception of information via the order wire. The signalling unit 114 is coupled to the assignment controller 119 via a PROM 701 which is connected to the address lines 429, and via a bi-directional data buffer 702, a data buffer 703, and an input/output (I/O) port 704 which are connected to the data lines 428. The operation of these units will be clear from the description below. Other parts of the signalling unit 114 which are shown in FIG. 7A comprise a timing and control unit 705, RAMs 706 to 710 having address inputs A and read/write control inputs W, multiplexers 711 to 715 having selection control inputs S, PROMs 716 and 717, latches 718 to 720 having clock inputs C, a cyclic code generator 721, a comparator 722, gates 723 and 724, and a unit 725 which is identical to a unit 726 constituted by the RAM 709, multiplexer 725, and latch 719.

The timing and control unit 705 is supplied via the lines 203 with timing signals from the interface unit 106, these signals including an 8 kHz clock signal which is synchronous with the signal frames, and a signal which occurs every 1.5 ms synchronously with the superframes, each of 12 frames, defined by the interface unit timing. The unit 705 includes a phase-locked loop which from the 8 kHz clock signal produces clock signals at frequencies of 38.4 kHz and 2.4 kHz, the latter signal being supplied to the modem 104 via a line 727, and also being counted within the unit 705 by a modulo-48 counter to produce a 6-bit address which is applied to the PROM 716 via lines 728. Each of the 48 combinations of this address identifies a respective bit of the signalling frame and is repeated every 48/2.4=20 ms, corresponding to the frame duration.

The unit 705 also produces on lines 729, 730, and 731 signals $\overline{\text{BIT 0}}$, $\overline{\text{BIT 32}}$, and STB respectively, these signals being shown in FIG. 3. In response to the signal STB=1 on the line 731, which is connected to a strobe input ST of the I/O port 704, during bits 0 and 32 of each signalling frame, the I/O port 704 supplies the previously mentioned interrupt signal to the assignment controller 119 via the line 424. In response to each interrupt the assignment controller 119 supplies via the address lines 429 to the PROM 701 an address which via output lines 732 of the PROM 701, one of which is connected to a select input SL of the I/O port 704, causes the data supplied via input lines 733 to the I/O port 704 to be supplied via the data lines 428 to the assignment controller. As this data includes the signal $\overline{\text{BIT 32}}$ on the line 730, the assignment controller 119 is able to distinguish from this data between an interrupt during bit 0, when the assignment controller can not write into the RAM 706 as described below, and an interrupt during bit 32 in response to which the assignment controller writes into the RAM 706 information required for the next signalling frame.

Except during bit 0 of each frame, via the line 729 the multiplexers 711 and 712 are controlled to supply addresses respectively from the address lines 429 to the RAM 706 and from the PROM 716 via lines 734 to the RAM 707, which via the gate 724 is controlled for reading out to lines 735 information stored therein. Except durihg bit 0, the assignment controller 119 can write into the RAM 706 information for the next signalling frame, this information consisting of 10 channel addresses each of 6 bits, one 6-bit word constituting the 6 C bits, and one 6-bit word constituting the 6 A bits. To this end the assignment controller supplies the relevant word or channel address via the data lines 428 while supplying via the address lines 429 an address which includes a 4-bit address for the RAM 706 and which is decoded by the PROM 701 to control the RAM 706 for write-in and to enable the data buffer 702 via an enable input E, whereby the data lines are coupled via the buffer 702 and lines 736 to the RAM 706.

During bit 0 of each signalling frame the unit 705 produces on a line 737 a signal which is alternately 1 and 0 in successive frames. In response to the address on lines 728 corresponding to bit 0 the PROM 716 controls the multiplexer 713 via lines 738 to couple the line 737 to its output line 739, and controls the multiplexer 714 via a line 790 to couple the line 739 to the line 123 leading to the modem 104, thereby producing the F bit of each signalling frame. Also during bit 0 of each signalling frame the RAMs 706 and 707 are controlled for read-out and write-in respectively, and in the unit 705 the 38.4 kHz clock signal is counted by a modulo-16 counter to produce on lines 741 a 4-bit address which is supplied to the RAMs 706 and 707 via the multiplexers 711 and 712. Accordingly, the information (12 6-bit words) previously supplied to the RAM 706 is written into the RAM 707.

During each C or A bit in each signalling frame, the PROM 716 supplies via the lines 734 an address to read out from the RAM 707 to the lines 735 the 6 C bits or A bits respectively, controls the multiplexer 713 via the lines 738 to couple the respective one of the 6 bits to the line 739, and controls the multiplexer 714 via the line 740 to couple the line 739 to the line 123. At the same time, via a line 742 the unit 705 supplies clock signals to the cyclic code generator 721, to enter the A and C bits from the line 739 into this code generator 721. The code generator 721 comprises a 5-stage shift register which is reset during bit 0 in each frame and which operates in known manner in accordance with the polynomial $1+X^2+X^5$ to produce the 5 check bits P1 to P5 from the 12 A and C bits. During the P bits in each signalling frame the PROM 716 produces on the line 740 the signal $\overline{ENCCG}=0$ as shown in FIG. 3, whereby the P bits are read out from the code generator 721 via the multiplexer 714 to the line 123. As an alternative to this arrangement, the P bits could be produced by a PROM to which the A and C bits are supplied.

During each S bit in each signalling frame, the PROM 716 supplies via the lines 734 an address to read out to the lines 735, and hence to one input of the comparator 722, the number or address ADD of the channel which has been assigned the respective signalling bit time channel. The cyclically recurring sequence of addresses ADD is supplied to another input of the comparator 722 via lines 743. The address on the lines 735 is present for about 416 μs, whereas the addresses on the lines 743 recur every 125 μs. When the comparator 722 detects identity of the addresses supplied to it, it supplies a signal via the AND gate 723 to the clock input C of the latch 720, which accordingly latches a signalling bit of the relevant channel which is present at this time on a line 744, and supplies it via a line 745 to the multiplexer 713. The AND gate 723 is enabled at this time by a signal ENSIG=1, shown in FIG. 3, which is supplied by the PROM 716 and is present on a line 746, and a clock signal which is produced by the unit 705 on a line 747. The PROM 716 controls the multiplexers 713 and 714 to couple the line 745 via the line 739 to the output line 123 during each S bit. In the event that two latchings by the latch 720 occur before the modem 104 samples the bit on the line 123 during the relevant S bit of the signalling frame, the first bit latched is replaced by the second bit latched, which is transmitted.

It will be recalled that the signalling bits of the channels are delayed before transmission, to allow time for the channel-to-signalling assignment information to be produced and transmitted. To this end, the signals on the line 113 are corrected and delayed by a total delay of 42 ms to produce the signals on the line 744. This delay of 42 ms, together with a delay of 20 ms provided in the receiving part of the signalling unit 114 as described below, provides a total delay of only 62 ms for the signalling information, which is insufficient to affect adversely equipment connected to the system.

Under the control of the unit 705, each signalling bit of each channel, occurring every 1.5 ms, together with the 11 previous signalling bits of the same channel available from the output of the RAM 708 on lines 748, is latched in the latch 718 under the control of the clock signal on the line 747. The latched signalling bits are written into the RAM 708 at the relevant address ADD present on the lines 743 under the control of a signal supplied by the unit 705 on a line 749. Accordingly, at any time the RAM 708 stores the 12 most recent signalling bits of each of the 48 channels 100. During each address ADD, the relevant 12 bits are read out from the RAM 708 and applied to the inputs of the PROM 717. The PROM 717 has outputs A and B which are connected respectively to the least and next most significant selection inputs of the multiplexer 715, which has a logic 1 or 0 supplied to each data input 0 to 7 as shown. The output of the multiplexer 715 is connected via the latch 719, which is controlled by the clock signal on the line 747 applied to its clock input C, to a line 750 and to the input of the RAM 709. Writing into the RAM 709 is controlled by the signal on the line 749 at the address ADD present on the lines 743, and the output of the RAM 709 is connected to the most significant selection input of the multiplexer 715. The output A of the PROM 717 is a logic 0 if all 12 inputs to the PROM are a logic 1, and the output B of the PROM 717 is a logic 0 if all 12 inputs to the PROM are a logic 0. The result of this arrangement is that signalling bits for each channel are produced on the line 750 delayed by 12×1.5 ms=18 ms, changes in the signalling bits on the line 113 being reproduced on the line 750 only if they are not followed by opposite changes within 18 ms. Such opposite changes occurring within 18 ms would represent errors in the signalling bits for example due to contact bounce, and are removed.

Whilst it is desirable to provide similar error removal for the signalling bits which are supplied to the assignment controller 119 via the line 122, a delay of 18 ms may be excessive in this case. Since most errors lead to opposite changes of signalling bits within 7.5 ms of one another, another two outputs A' and B' of the PROM 717 are provided together with another unit 725 which is identical to the unit 726 and whose output is connected to the line 122. These further PROM outputs A' and B' and the unit 725 operate in exactly the same manner as described above but with respect to only the last 5 signalling bits of each channel. Thus the partially corrected signalling bits on the line 122 are delayed by only $5 \times 1.5$ ms = 7.5 ms in relation to the signalling bits on the line 113.

Timing signals supplied to the unit 705 and occurring every 1.5 ms are counted in the unit 705 by a modulo-16 counter to produce a 4-bit address on lines 751, which address is cyclically repeated every 24 ms. This address and the address ADD on the lines 743 are applied as address signals to the RAM 710, into which write-in of signalling bits from the line 750 and from which read-out of signalling bits to the line 744 are controlled by the unit 705 via the line 749. The RAM 710 thus delays the signalling bits by a further 24 ms, resulting in the total delay of 42 ms.

Referring now to FIG. 7B, for handling information received via the order wire the signalling unit 114 comprises a timing and control unit 760, a frame synchronizing unit 761, a frame counter 762, PROMs 763 and 764, a 20 ms (1 frame) delay unit 765, shift registers 766 to 768, latches 769 and 770, a multiplexer 771, and an Exclusive-OR gate 772.

The unit 760 includes a phase locked loop to generate timing signals at 2.4 kHz and multiples thereof from a 2.4 kHz received clock signal supplied from the modem 104 via a line 773. These timing signals and the information incoming from the modem 104 via the line 124 are supplied to the frame synchronizing unit 761, which can be of the type described in Feder U.S. Pat. No. 3,541,456 issued Nov. 17, 1970 and serves to detect the F bits in the signalling frames. In the event of a loss of frame synchronization, the unit 761 produces on a line 774 a signal LOFR which is supplied to an input I of the PROM 763 to inhibit its outputs and is also supplied to the I/O port 704. In the event of a failure of the facility 101 used as the order wire, the modem 104 produces on a line 775 a signal LOFA which is supplied to the unit 760 and to the I/O port 704.

The unit 760 includes a modulo-48 counter which, in normal synchronized operation, counts the 2.4 kHz timing signals to produce on lines 776 a 6-bit address which is supplied to and decoded by the PROM 763. This counter also produces a pulse once per signalling frame which is supplied as a clock pulse via a line 774 to the frame counter 762. Via lines 778 the PROM 763 and unit 760 control the shift registers 766 to 768 so that in each signalling frame the 12 A and C bits from the line 124 are entered into an assignment shift register 768 and these bits and the 5 P bits from the line 124 are applied to a check bit shift register 767, and so that 3 times in each signalling frame 10 S bits, one for each channel whose signalling information is being transmitted via the order wire, are entered into a signalling shift register 766 from the output of the delay unit 765. The delay unit 765 is controlled by the unit 760 via lines 779 to delay signals on the line 124 by 1 frame to allow time for decoding received channel-to-signalling assignments. As already mentioned, this delay unit 765 can include signalling bit correction circuitry similar to that described above and provided in the transmitting part of the signalling unit. The unit 760 also produces on a line 780 a signal $\overline{\text{SIGCLK}}$ under the control of which each set of 10 signalling bits from the shift register 766 is latched in parallel in the receiver 112. FIG. 3 shows the signal $\overline{\text{SIGCLK}}$ and a signal $\overline{\text{TIM}}$ referred to below in relation to the bits of the received signalling frame; these signals are not, however, synchronized with the other signals shown in FIG. 3 in relation to the bits of the transmitted signalling frame.

On receipt of the last check bit, P5, during bit 42 of the received signalling frame the shift register 767, which has a similar form to that of the cyclic code generator 721, produces on a line 781 a check result CR which indicates whether any error has been detected in the received A and C bits. This check result is supplied to the I/O port 704, to the timing and control unit 760, and to an input I of the PROM 764. In the event of an error being detected, the outputs of the PROM 764 are inhibited and the production of the signal $\overline{\text{TIM}}$, described below, by the unit 760 is prevented. Although not shown in FIG. 7B for the sake of clarity, the outputs of the PROM 764 are also inhibited in the presence of either of the signals LOFA and LOFR.

During bit 43 of the received signalling frame the unit 760 produces on a line 782 a signal which is applied to the clock inputs C of the latches 769 and 770 to cause the 12 A and C bits of the frame, available in parallel from the shift register 768, to be latched by the latch 769 and to cause decoded signals, produced by the PROM 764 from the 12 A and C bits, to be latched by the latch 770. The decoded signals comprise signals SPASS, SIGASS, 3dBON, 3dBOFF, RR, ACM, MCM, and SFS, one of which is produced at the outputs of the latch, depending on the A and C bits, and whose significance is as follows. The first four signals SPASS, SIGASS, 3dBON, and 3dBOFF constitute control information signals which are supplied to the receiver 112 via lines 783 and are produced in the event that the 12 A and C bits constitute a channel-to-facility assignment, a channel-to-signalling assignment, a message to introduce a 3dB attenuation, and a message to remove the 3dB attenuation, respectively. These signals are also supplied to the unit 760, which in response to any of these signals produces the signal $\overline{\text{TIM}}$ on a line 784 extending to the receiver 112. In the case of assignments, the A and C bits are supplied from the latch 769 via lines 785 to the receiver 112.

The signal RR or ACM is produced on a line 786 or 787 respectively if the 12 A and C bits constitute respectively a retransmission request, containing an 8-bit number identifying the frame to be retransmitted, or an 8-bit message for the assignment controller 119. These signals are supplied to the I/O port 704, to the gate 772 which controls the multiplexer 771 to couple the received 8-bit frame count or message from the latch 769 to data inputs D of the buffer 703, and to the unit 760 which consequently produces the signal $\overline{\text{TIM}}$ on a line 788 connected to a clock input C of the buffer 703, thereby latching the received frame count or message. In a similar manner, in the event that the 12 A and C bits contain an 8-bit message for the maintenance controller 127, the signal MCM is produced on a line 789 leading to the unit 760, which consequently produces the signal $\overline{\text{TIM}}$ on a line 790 which, together with lines 791 carrying the 8-bit message from the latch 769, leads to an I/O port (not shown) for the maintenance controller. The signal SFS is produced on a line 792 in the event that the A and C bits constitute the synchronization word for the frame counter; this signal serves to reset the frame counter 762.

As already explained, when the assignment controller 119 is interrupted during bit 32 of the transmitted signalling frame by a signal on the line 424, it interrogates the I/O port 704 so that it is supplied via the data lines 428 with any signal LOFA, LOFR, CR, ACM, or RR which may have occurred. In response to the signal RR or ACM it interrogates the buffer 703 by supplying on the address lines 429 an address which causes the PROM 701 to supply a signal via the lines 732 to the enable input E of the buffer 703, whereupon the assignment controller is supplied with the received frame count or message. If the signal RR was present, in accordance with its priority scheme the assignment controller causes the relevant frame's A and C bits, stored in its RAM 403, to be supplied to the signalling unit 114 for retransmission in the next signalling frame. In response to the signal CR, the assignment controller 119 also interrogates the buffer 703, which in this case is supplied with the current frame count from the frame counter 762 via lines 793 and the multiplexer 771. To this end the unit 760 is also supplied with the signal CR on the line 781 and produces the signal $\overline{\text{TIM}}$ on the line 788, to latch the frame count in the buffer 703, in the event of a detected error. In response to the signal LOFA or LOFR the assignment controller can select another facility 101 as the order wire.

Figure 8:
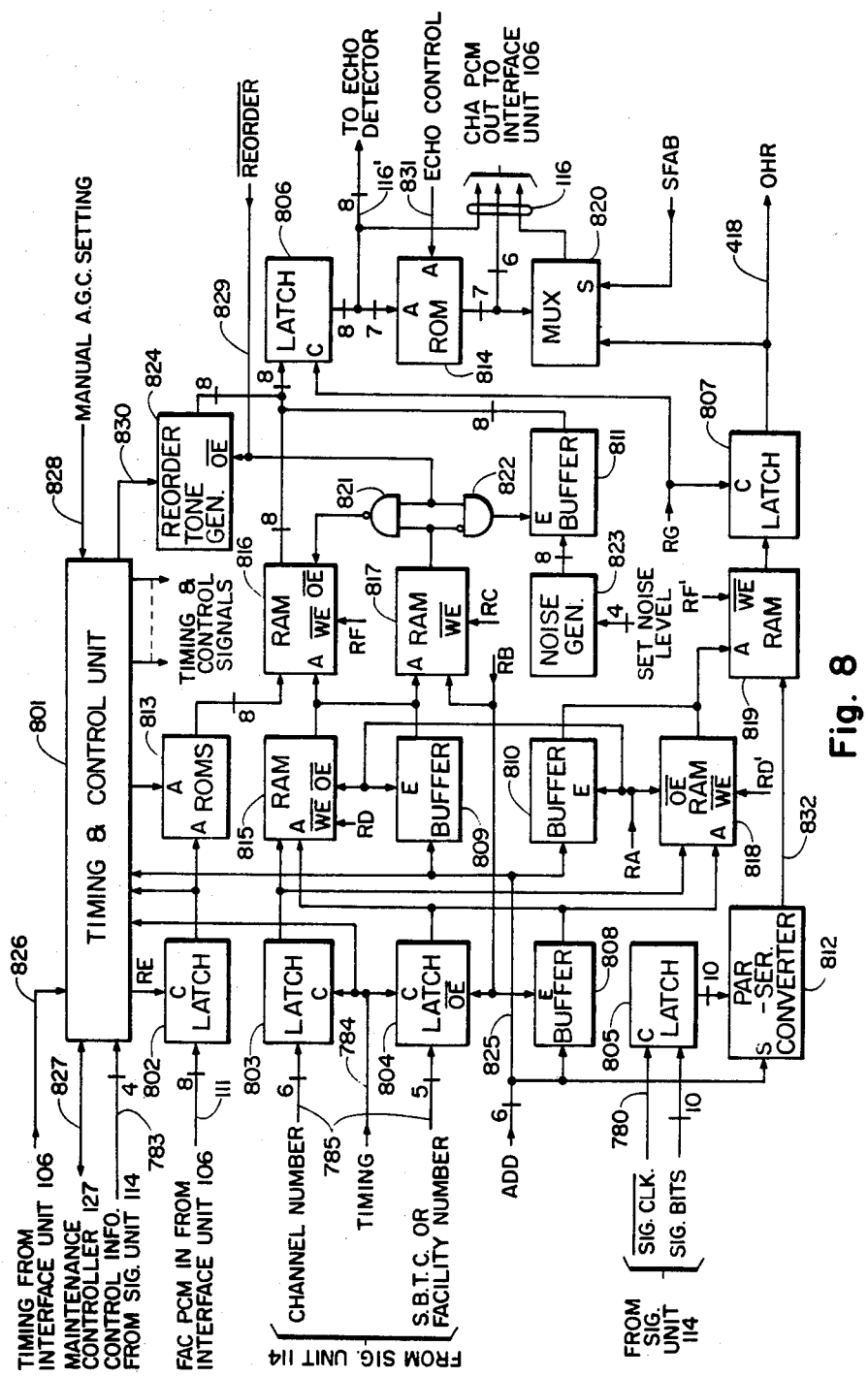
FIG. 8 illustrates a receiver of the system.
Figure 9:
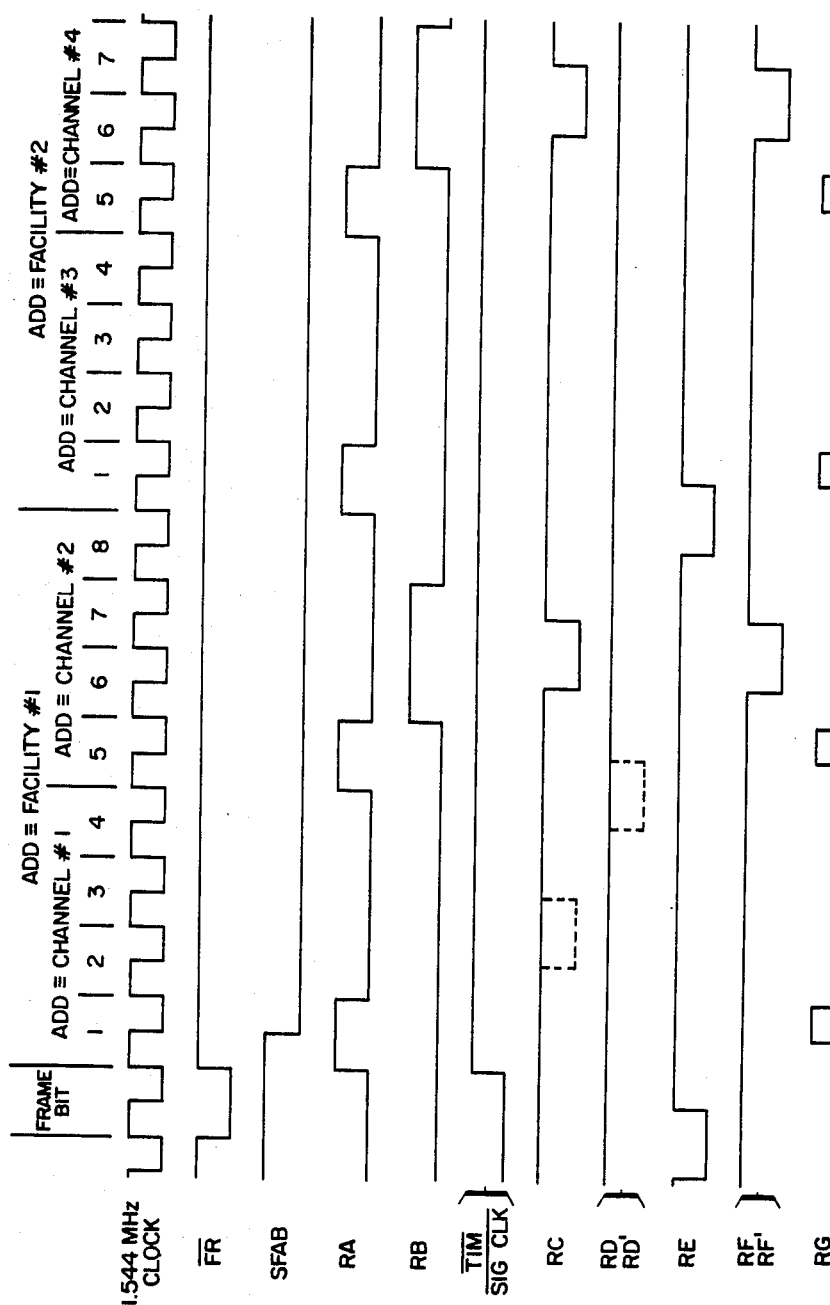
FIG. 9 shows timing signals which occur in operation of the receiver.

The receiver 112 is shown in detail in FIG. 8, and timing signals which occur in operation of the receiver 112 are shown in FIG. 9. The receiver 112 comprises a timing and control unit 801; latches 802 to 807 each having a clock input C, the latch 804 also having an output enable input $\overline{\text{OE}}$; buffers 808 to 811 each having an enable input E; a parallel-serial converter (multiplexer) 812 having control or selection inputs S; two read-only memories (ROMs) 813 shown in a single block, and a further ROM 814, having address inputs A; random access memories (RAMs) 815 to 819 each having a write-enable input $\overline{\text{WE}}$ and address inputs A, the RAMs 815, 816, and 818 also having output enable inputs $\overline{\text{OE}}$; a multiplexer 820 having a selection control input A; gates 821 and 822; a noise generator 823; and a reorder tone generator 824 having an output enable input $\overline{\text{OE}}$.

The timing and control unit 801 is supplied with the control information on lines 783 and the signal $\overline{\text{TIM}}$ on the line 784 from the signalling unit 114, with the address ADD on lines 825 and with timing signals from the interface unit 106 via lines 826, and produces the various timing and control signals RA to RG shown in FIG. 9. The timing signals on the lines 826 include a 1.544 MHz clock signal and a signal $\overline{\text{FR}}$ shown at the top of FIG. 9, where the identity of the addresses ADD is also indicated. The signal $\overline{\text{FR}}$=0 identifies the frame bit of each 193-bit, 125 μs frame on the lines 107 and 115. The unit 801 is also coupled to the naintenance controller 127 via lines 827, is supplied with a manual A.G.C. setting via lines 828, is connected to the output of the latch 802, and supplies addresses to the ROMs 813 for the purposes described below.

In operation, for each facility identified by the address ADD, the RAM 815 stores the number or address ADD of the channel which is temporarily assigned to the facility. For each channel identified by the address ADD, the RAM 817 stores a logic 1 if the channel is active or a logic 0 if the channel is not active. This stored information is updated as follows. In the event of a speech assignment being received, the unit 801 is supplied via the lines 783 with the signal SPASS and in consequence produces the signals RC and RD with the pulses shown in phantom lines in FIG. 9. At the start of a frame, with a transition of the signal $\overline{\text{TIM}}$ on the line 784 from 0 to 1, the received channel number and facility number (for which only 5 of the 6 available bits are required) on the lines 785 are latched in the latches 803 and 804 respectively. During the pulse RC=0 shown in phantom lines in FIG. 9, this pulse being produced only during the first address ADD and not during the other addresses ADD, the signals RA and RB are a logic 0, so that the outputs of the latch 804 and RAM 815 are enabled and the buffers 808 and 809 are not enabled. Consequently the RAM 815 is addressed by the received facility number from the latch 804 to read out and address the RAM 817 with the number of the channel previously assigned to this facility. With the signals RB=0 and RC=0, a logic 0 is stored in the RAM 817 in respect of this previously assigned channel, whereby its activity status is updated. Subsequently, with the pulse of the signal RD, write-in to the RAM 815 is enabled whereby the received channel number from the latch 803 is stored in the RAM 815 at the facility address which is still supplied from the latch 804 because the signal RB is still a logic 0.

Under the control of the signal RE, for each facility identified by the address ADD a PCM word, the 8 bits of which are available in parallel on the lines 111, incoming from the facility via the interface 106 is latched in the latch 802 and applied to address inputs of the ROMs 813. As already explained, the ROMs 813 comprise two ROMs, one of which serves to provide an optional 3dB attenuation under the control of the control information signals 3dBON, 3dBOFF supplied to the unit 801 via the lines 783, and the other of which serves to provide an automatic gain control (A.G.C.) of the PCM words. The A.G.C. can be set manually by signals applied to the unit 801 via the lines 828, in which case it is constant for all of the facilities 101, or it can be controlled by the maintenance controller 127 individually for each facility. The desired A.G.C. setting for each facility is determined by the maintenance controller 127 from an average signal level produced in the unit 801 by averaging the PCM words at the output of the latch 802 for each facility.

The resultant 8-bit PCM word produced at the output of the ROMs 813 is stored in the RAM 816 with the signal RF=0 applied to its write enable input $\overline{\text{WE}}$. As shown in FIG. 9, at this time the signal RA=0 to enable the output of the RAM 815, the buffer 809 not being enabled, and the signal RB=1 to enable the buffer 808, so that the facility number constituted by the address ADD present on the lines 825 is conducted via the buffer 808 to address the RAM 815 to read out therefrom the address of the channel currently assigned to the facility, this address constituting an address for both the RAM 816 and the RAM 817. Thus for each facility, in each 125 μs frame, a PCM word is written into the RAM 816 at the address of the channel assigned to the facility, and at the same time with the signals RB=1 and RC=0 (full-line pulse in FIG. 9) a logic 1 is stored in the RAM 817 to indicate that the channel assigned to the facility is active.

During the first 1.544 MHz clock period that the address ADD identifies each of the 48 channels, as shown in FIG. 9 the signal RA=1 so that the output of the RAM 815 is not enabled but the buffer 809 is enabled to supply the address ADD from the lines 825 to address the RAMs 816 and 817. If a signal $\overline{\text{REORDER}}$ supplied on a line 829 is a logic 0, the output of the reorder tone generator 824, which is supplied with an 8 kHz clock signal from the unit 801 via a line 830, is enabled to supply an 8-bit word forming part of a reorder tone to the latch 806; in addition, the gates 821 and 822 are inhibited, so that neither the buffer 811 nor the output of the RAM 816 is enabled. If the signal $\overline{\text{REORDER}}$ = 1, the output of the generator 824 is not enabled, and via the gates 821 and 822 either the output of the RAM 816 or the buffer 811 is enabled depending upon whether or not, respectively, a logic 1 is read out of the RAM 817 indicating that the channel is active. Thus in respect of an active channel the PCM word stored in the RAM 816, and in respect of an inactive channel an 8-bit word forming part of a noise signal generated by the noise generator 823 and passed through the buffer 811, is supplied to the latch 806. The level of noise generated by the generator 823 is controlled in a similar manner to the A.G.C. setting in the ROMs 813, in accordance with either manually produced signals or signals produced by the maintenance controller 127 in response to a determination of the average noise level of the facilities. In the latter respect reference is directed to co-pending U.S. patent application Ser. No. 218,751, entitled "Noise Signal Level Control in a TASI System", filed simultaneously herewith, the entire disclosure of which is incorporated herein by reference.

With the signal RG=1, the relevant 8-bit word supplied to the latch 806 is latched therein, and is supplied to the echo detector via the lines 116' as already described. In addition, the sign bit of the word is supplied directly, the 6 most significant bits of the word are supplied via the ROM 814 and the least significant bit is supplied via the ROM 814 and the multiplexer 820 as decribed below, to the lines 116 leading to the interface unit 106. The ROM 814 is controlled by the echo detector via a line 831 to provide a 6dB attenuation in the event that an echo signal is detected in respect of the particular channel.

The RAM 818 stores, for each address ADD which corresponds to one of the 10 signalling bit time channel (S.B.T.C.) numbers, the number of the channel currently assigned to the S.B.T.C., and is updated under the control of a signal RD' in the same manner as the RAM 815 is updated under the control of the signal RD. The unit 801 produces a pulse of the signal RD', as shown in phantom lines in FIG. 9, in response to the control information signal SIGASS being supplied to it via the lines 783. In the case of a channel-to-signalling assignment, of course, the S.B.T.C. number, rather than a facility number, is supplied with the channel number on the lines 785, is latched in the latch 804, and is used to address the RAM 818.

Signalling bits from the receiver 112 are latched in the latch 805 under the control of the signal $\overline{\text{SIGCLK}}$, each latching occurring at the start of a 125 μs frame. During the frame, whenever the address ADD is the same as one of the S.B.T.C. numbers, the relevant signalling bit in the latch 805 is selected by the parallel-serial converter or multiplexer 812 and is supplied via a line 832 to the RAM 819. With the signal RF'=0 enabling the RAM 819 for write-in, and with the signals RB=1 and RA=0 enabling the buffer 808 to supply the address ADD to the RAM 818 and enabling the output of the RAM 818 to address the RAM 819 with the assigned channel number, the signalling bit is written into the RAM 819 at the address of the channel to which it relates. The signal RF' is the same as the signal RF except that the signal RF' is produced only during those parts of the 125 μs frame when the address ADD corresponds to one of the S.B.T.C. numbers. For all of the channels, signalling bits are latched in the latch 807 with the signal RG=1 when the address ADD identifies the relevant channel, at which time the signal RA=1 so that the output of the RAM 818 is not enabled but the buffer 810 is enabled to supply the address ADD to the RAM 819. The output of the latch 807 constitutes the signal OHR on the line 418 as already described, and is also applied to an input of the multiplexer 820. The multiplexer 820 is controlled by a signal SFAB, shown in FIG. 9, and serves in known manner to insert the channel signalling bits in place of the least significant bits of the PCM words in superframes, each of 12 125 μs frames of the channel signals.

Although a particular embodiment of the invention has been described and illustrated, it should be appreciated that numerous modifications, adaptations, and variations may be made without departing from the scope of the invention as defined by the claims.

What is claimed is:

1. A method of transmitting channel-to-facility assignment and channel signalling information in a TASI system in which signals from a plurality of channels are interpolated for transmission via a lesser plurality of transmission facilities, comprising the steps of:
   providing one of said facilities for the transmission of said information;
   defining time division multiplex frames, each frame comprising a plurality of time slots forming a first part of the frame and a plurality of time slots forming a second part of the frame;
   transmitting channel signalling information via said one facility during said first part of the frames; and
   transmitting channel-to-facility assignment information, relating to the assignment of said channels to the other facilities for said interpolated transmission, via said one facility during said second part of the frames.

2. A method as claimed in claim 1 wherein channel signalling information for only some of said channels is transmitted during said first part of each frame, the method including the steps of:
   determining channels whose signalling information is to be transmitted via said one facility and assigning the determined channels to respective parts of the first part of the frames for transmission of their signalling information;
   transmitting channel signalling assignment information, relating to the assignment of said determined channels to said respective parts of said first part of the frames, via said one facility during said second part of the frames;
   delaying the signalling information of at least each of said determined channels; and
   transmitting the delayed signalling information of said determined channels during the respective parts of said first part of the frames.

3. A method as claimed in claim 2 wherein each of said respective parts of the first part of the frames comprises a plurality of time slots in each frame, for transmission of a plurality of signalling bits of the relevant determined channel in each frame, and wherein each frame is divided into said parts so that the time slots of each of said respective parts of the first part of the frames occur periodically in the frames, whereby signalling bits of each determined channel are transmitted periodically.

4. A method as claimed in claim 2 or 3 wherein the step of delaying the signalling information includes the step of removing erroneous pulses from the signalling information during its delay.

5. A method as claimed in claim 1, 2, or 3 wherein each frame further comprises a plurality of time slots forming a third part of the frame, the method including the step of producing and transmitting via said one facility during said third part of each frame checking information which is dependent upon the information of said second part of the respective frame.

6. A method as claimed in claim 1, 2, or 3 and including the step of transmitting message information via said one facility during said second part of the frames when no assignment information is required to be transmitted.

7. A method as claimed in claim 1, 2, or 3 wherein the step of providing one of said facilities for the transmission of said information comprises the steps of:
   selecting one of said facilities as said one facility;
   monitoring the other facilities to determine an order of preference of said other facilities for use as said one facility, and
   in response to errors in information transmitted via the facility currently selected as said one facility, selecting a most preferred one of said other facilities as said one facility.

8. A TASI system in which speech signals from a plurality of channels are interpolated for transmission via a lesser plurality of transmission facilities, said system comprising:
   means for defining time division multiplex frames on one of said facilities;
   detecting means for detecting, in respect of each channel, speech signals to be transmitted;
   a buffer for storing said speech signals to be transmitted;
   control means for assigning each channel having speech signals to be transmitted to a respective one of the other facilities for transmission of said speech signals, and for producing channel-to-facility assignment information relating to the assignment;
   means for supplying the stored speech signals to be transmitted from the buffer to the respective facility for transmission; and
   transmitting means for transmitting channel signalling information and said channel-to-facility assignment information via said one facility during first and second parts, respectively, of said frames.

9. A TASI system as claimed in claim 8 wherein said first part of each frame provides for transmission of signalling information for only some of said channels, wherein:
   said control means comprises means for determining each channel which has channel signalling information to be transmitted via said one facility, for assigning the determined channels temporarily to respective parts of said first part of the frames, and for producing channel signalling assignment information relating to each assignment; and
   said transmitting means comprises means for transmitting, via said one facility in said respective parts of said first part of the frames, said channel signalling information of the determined channels and for transmitting via said one facility said channel signalling assignment information in said second part of the frames.

10. A TASI system as claimed in claim 9 and including delay means for delaying, before transmission, said channel signalling information of the determined channels.

11. A TASI system as claimed in claim 10 wherein said delay means includes means for removing erroneous pulses from the channel signalling information.

12. A TASI system as claimed in claim 8 or 9 wherein said transmitting means comprises means for producing and transmitting in a third part of each frame checking information which is dependent upon the information of said second part of the respective frame.

13. A TASI system as claimed in claim 8 or 9 wherein said channels and said transmission facilities comprise telephone lines, the system further including means for converting analog signals incoming on said channels into digital signals for storage in said buffer, and for converting digital signals supplied from said buffer into analog signals for transmission via said other facilities.

* * * * *